(12) United States Patent
Nishiwaki et al.

(10) Patent No.: US 6,819,261 B2
(45) Date of Patent: Nov. 16, 2004

(54) RELIABLE OBSTACLE DETECTING DRIVING SUPPORT APPARATUS

(75) Inventors: Takeshi Nishiwaki, Tokyo (JP); Minoru Nishida, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 10 days.

(21) Appl. No.: 10/286,771

(22) Filed: Nov. 4, 2002

(65) Prior Publication Data

US 2003/0214393 A1 Nov. 20, 2003

(30) Foreign Application Priority Data

May 20, 2002 (JP) ....................................... 2002-144413

(51) Int. Cl.⁷ ................................................. G08G 1/16
(52) U.S. Cl. ...................... 340/903; 340/435; 340/436; 340/904
(58) Field of Search .................................. 340/903, 904, 340/435, 436, 932.2, 933, 686.1

(56) References Cited

U.S. PATENT DOCUMENTS

| | | | | |
|---|---|---|---|---|
| 6,018,308 | A | * | 1/2000 | Shirai .......................... 342/70 |
| 6,211,778 | B1 | * | 4/2001 | Reeves ........................ 340/436 |
| 6,246,339 | B1 | * | 6/2001 | Yamazaki .................... 340/933 |
| 6,411,901 | B1 | * | 6/2002 | Hiwatashi et al. .......... 701/301 |
| 6,553,130 | B1 | * | 4/2003 | Lemelson et al. .......... 382/104 |

FOREIGN PATENT DOCUMENTS

| | | |
|---|---|---|
| JP | 06-148328 | 5/1994 |
| JP | 10-112000 | 4/1998 |
| JP | 2000-180537 | 6/2000 |

* cited by examiner

*Primary Examiner*—Jeffery Hofsass
*Assistant Examiner*—Eric Blount
(74) *Attorney, Agent, or Firm*—Sughrue Mion, PLLC

(57) ABSTRACT

Provided is a driving support apparatus that allows a driver to know the reliability of provided information by performing the switching of contents of voice information in accordance with a reliability indicator value concerning an obstacle detection result. The driving support apparatus includes: an obstacle detecting unit for detecting an obstacle around a vehicle; and an obstacle information providing unit for outputting, by voice, positional information of the obstacle detected by the obstacle detecting unit, wherein the obstacle detecting unit includes a function of calculating a reliability indicator value concerning a detection result, and the obstacle information providing unit includes obstacle information providing and a judging unit that judges switching of contents of voice information to be provided in accordance with magnitude of the reliability indicator value outputted from the obstacle detecting unit.

14 Claims, 10 Drawing Sheets

FIG. 7A

① LIST OF VOICE INFORMATION WITH WARNING CONTENTS

| ALARMING TARGET AREA | VOICE INFORMATION |
|---|---|
| VEHICULAR FRONT SIDE | DANGER, FRONT SIDE! |
| VEHICULAR LEFT-FRONT SIDE | DANGER, LEFT-FRONT SIDE! |
| VEHICULAR LEFT SIDE | DANGER, LEFT SIDE! |
| VEHICULAR LEFT-REAR SIDE | DANGER, LEFT-REAR SIDE! |
| VEHICULAR REAR SIDE | DANGER, REAR SIDE! |
| VEHICULAR RIGHT-FRONT SIDE | DANGER, RIGHT-FRONT SIDE! |
| VEHICULAR RIGHT SIDE | DANGER, RIGHT SIDE! |
| VEHICULAR RIGHT-REAR SIDE | DANGER, RIGHT-BACK SIDE! |

FIG. 7B

② LIST OF VOICE INFORMATION WITH ATTENTION CALLING CONTENTS

| ALARMING TARGET AREA | VOICE INFORMATION |
|---|---|
| VEHICULAR FRONT SIDE | PLEASE PAY ATTENTION TO FRONT SIDE! |
| VEHICULAR LEFT-FRONT SIDE | PLEASE PAY ATTENTION TO LEFT-FRONT SIDE! |
| VEHICULAR LEFT SIDE | PLEASE PAY ATTENTION TO LEFT SIDE! |
| VEHICULAR LEFT-REAR SIDE | PLEASE PAY ATTENTION TO LEFT-REAR SIDE! |
| VEHICULAR REAR SIDE | PLEASE PAY ATTENTION TO REAR SIDE! |
| VEHICULAR RIGHT-FRONT SIDE | PLEASE PAY ATTENTION TO RIGHT-FRONT SIDE! |
| VEHICULAR RIGHT SIDE | PLEASE PAY ATTENTION TO RIGHT SIDE! |
| VEHICULAR RIGHT-REAR SIDE | PLEASE PAY ATTENTION TO RIGHT-BACK SIDE! |

FIG. 7C

③ LIST OF VOICE INFORMATION WITH CONCLUSIVE CONTENTS

| ALARMING TARGET AREA | VOICE INFORMATION |
|---|---|
| VEHICULAR FRONT SIDE | OBSTACLE IS ON FRONT SIDE x x m AWAY |
| VEHICULAR LEFT-FRONT SIDE | OBSTACLE IS ON LEFT-FRONT SIDE x x m AWAY |
| VEHICULAR LEFT SIDE | OBSTACLE IS ON LEFT SIDE x x m AWAY |
| VEHICULAR LEFT-REAR SIDE | OBSTACLE IS ON LEFT-REAR SIDE x x m AWAY |
| VEHICULAR REAR SIDE | OBSTACLE IS ON REAR SIDE x x m AWAY |
| VEHICULAR RIGHT-FRONT SIDE | OBSTACLE IS ON RIGHT-FRONT SIDE x x m AWAY |
| VEHICULAR RIGHT SIDE | OBSTACLE IS ON RIGHT SIDE x x m AWAY |
| VEHICULAR RIGHT-REAR SIDE | OBSTACLE IS ON RIGHT-REAR SIDE x x m AWAY |

FIG. 7D

④ LIST OF VOICE INFORMATION WITH PRESUMPTIVE CONTENTS

| ALARMING TARGET AREA | VOICE INFORMATION |
|---|---|
| VEHICULAR FRONT SIDE | OBSTACLE MAY BE ON FRONT SIDE x x m AWAY |
| VEHICULAR LEFT-FRONT SIDE | OBSTACLE MAY BE ON LEFT-FRONT SIDE x x m AWAY |
| VEHICULAR LEFT SIDE | OBSTACLE MAY BE ON LEFT SIDE x x m AWAY |
| VEHICULAR LEFT-REAR SIDE | OBSTACLE MAY BE ON LEFT-REAR SIDE x x m AWAY |
| VEHICULAR REAR SIDE | OBSTACLE MAY BE ON REAR SIDE x x m AWAY |
| VEHICULAR RIGHT-FRONT SIDE | OBSTACLE MAY BE ON RIGHT-FRONT SIDE x x m AWAY |
| VEHICULAR RIGHT SIDE | OBSTACLE MAY BE ON RIGHT SIDE x x m AWAY |
| VEHICULAR RIGHT-REAR SIDE | OBSTACLE MAY BE ON RIGHT-REAR SIDE x x m AWAY |

FIG. 8

|  |  | RELIABILITY INDICATOR VALUE | |
|---|---|---|---|
|  |  | GREAT | SMALL |
| POSSIBILITY OF COLLISION | STRONG | ①WARNING CONTENTS | ②ATTENTION CALLING CONTENTS |
| | SMALL | ③CONCLUSIVE CONTENTS | ④PRESUMPRIVE CONTENTS |

RELIABLE OBSTACLE DETECTING DRIVING SUPPORT APPARATUS

BACKGROUND OF THE INVENTION

1. Field of the Invention

The present invention relates to a driving support apparatus.

2. Description of the Related Art

Conventionally, there have been proposed many systems that provide information to drivers by detecting obstacles or preceding vehicles existing around own vehicles or by detecting in-lane positions of the own vehicles. There have also been proposed many systems that aid driving operations of drivers or perform the driving operations in place of drivers on the basis of detection results. The oversight or misidentification of detection targets that occurs in these systems has become a large problem because it becomes impossible to ensure that sufficient convenience and safety are provided by the systems for the drivers. Here, the term "oversight" is defined as a situation where "no obstacle is detected although there exists any dangerous target object", while the term "misidentification" is defined as a situation where "an obstacle is detected although there exists no dangerous target object".

That is, if obstacle detection sensitivity is enhanced in order to circumvent the "oversight" for the sake of enhancing the safety, there frequently occurs the "misidentification". Consequently, this enhancement of the obstacle detection sensitivity is not acceptable from the viewpoint of practical use because the driver's convenience provided by the systems is reduced. Also, if the obstacle detection sensitivity is conversely reduced in order to suppress the "misidentification", there is reduced the safety, which renders the systems useless.

In view of these problems, there have been proposed several apparatuses that reduce the frequency of occurrence of the oversight and misidentification. In JP 06-148328 A titled "Obstacle Recognition Apparatus for Vehicle", for instance, there is proposed an apparatus that divides an area around a vehicle into small regions, stores a probability value expressing at least one of the probability of the presence of an obstacle and the probability of the absence of an obstacle for each small region, and performs totalizing to improve the reliability of detection, wherein the reliability is further improved by updating the stored value on the basis of the correspondences between (i) the small regions before displacement of the vehicle and a change of an azimuth angle and (ii) the small regions after the displacement and change.

Also, in JP 10-112000 A titled "Obstacle Recognition Apparatus", there is proposed an obstacle recognition apparatus that is provided with a plurality of sensor units and enhances the reliability of detection using a means for judging to which one of three region evaluations of "presence of obstacle", "absence of obstacle", and "ambiguous" each point within a measurement range of each sensor unit belongs and a means for calculating the degree of sureness of the judgment result, wherein the merger of detection results of the plurality of sensor units is easily performed using the calculated degree of sureness.

Further, in JP 2000-180537 A titled "Method for Identifying Target to be Controlled of Scan-Type Radar", there is proposed an intervehicular distance control system whose reliability is improved by obtaining an existence probability value and an own lane probability value in consideration of a detection distance, a positional deviation, the number of detection beams, a relative speed, and the state of an object (whether the object is stationary or moving), and by judging whether the detected object is a preceding vehicle that will become a control target using the obtained probability values.

Even with the proposed techniques described above, however, it is impossible to completely eliminate the occurrence of the oversight and misidentification using currently available techniques. On the other hand, even if there is provided information whose contents are incorrect because there occurs oversight or misidentification of a detection means in these systems that provide information, aid a driving operation, or perform a driving operation in place of a driver, there is a possibility that a system is realized which provides convenience acceptable to the driver by suppressing the frequency, with which incorrect information is provided, to a certain level.

Also, in the system that aids a driving operation of a driver or performs a driving operation in place of a driver on the basis of a detection result, even if the system does not aid the driving operation or does not perform the driving operation in place of the driver with reliability because there occurs the oversight or misidentification of a detection means, if the degree of danger of a malfunction of the system is sufficiently small and it is possible for the driver to recover the malfunction, there is a possibility that a system is realized which provides safety acceptable to the driver.

That is, even if the occurrence of the oversight and misidentification of a detection means is not completely eliminated, there is a possibility that the system is put to practical use by realizing both of convenience and safety using the system.

By the way, in these systems that provide information, aid a driving operation, or perform a driving operation in place of a driver, the reliability of the provided information, the reliability of an operation performed by the systems to aid a driving operation, or the reliability of an operation performed by the systems to perform a driving operation in place of a driver has a significant meaning for the driver's convenience provided by the systems.

In a system that detects an obstacle, a vehicle, or the like existing around an own vehicle and provides information to a driver, for instance, even if the information is provided in the same manner as in the case of high reliability although the reliability of the obstacle detection result is low, it is impossible for the driver to know the reliability. Consequently, each time information is provided, the driver is placed in a tense condition because he/she has to worry about an obstacle. As a result, the driver regards this situation as a nuisance. It may be conceived to use a technique with which the problem described above is prevented by refraining from providing information in the case of low reliability, although this technique is not preferable from the viewpoint of ensuring safety.

Also, in a system that aids a driving operation of a driver or performs a driving operation in place of a driver on the basis of a detection result, it is impossible for the driver to know the reliability of the system operation. Consequently, it is required that the driver always maintains a tense condition as a preparation to a malfunction of the system, which impairs the driver's convenience provided by the system.

SUMMARY OF THE INVENTION

The prevent invention has been made in the light of the problems described above, and the object of the present invention is to provide a driving support apparatus that makes it possible to realize a level, which is acceptable to a driver, of each of the convenience and safety provided by the system by using a means that allows the driver to naturally know the reliability of provided information, the reliability of an operation performed by the system to aid a driving operation, and the reliability of an operation performed by the system to perform a driving operation in place of a driver.

A driving support apparatus according to an aspect of the present invention includes: obstacle detecting means for detecting an obstacle around a vehicle; and obstacle information providing means for outputting, by voice, positional information of the obstacle detected by the obstacle detecting means, wherein the obstacle detecting means includes a function of calculating a reliability indicator value concerning a detection result, and the obstacle information providing means includes obstacle information providing and judging unit that judges switching of contents of voice information to be provided in accordance with magnitude of the reliability indicator value outputted from the obstacle detecting means.

A driving support apparatus according to another aspect of the present invention includes: a preceding vehicle detecting means for detecting a preceding vehicle; an intervehicular distance control means for controlling an intervehicular distance to the preceding vehicle detected by the preceding vehicle detecting means; a function of calculating a reliability indicator value concerning a detection result of the preceding vehicle detecting means; and obstacle information providing means for providing voice information for calling driver's attention when the reliability indicator value changes from a state where the reliability indicator value is larger than a preset threshold value to a state where the reliability indicator value is smaller than the preset threshold value.

A driving support apparatus according to still another aspect of the present invention includes: in-lane position detecting means for detecting an in-lane position of an own vehicle; steering control means for performing control for keeping in-lane traveling on the basis of a detection result concerning the in-lane position detected by the in-lane position detecting means; a function of calculating a reliability indicator value concerning the detection result of the in-lane position detecting means; and obstacle information providing means for providing voice information for calling driver's attention when the reliability indicator value changes from a state where the reliability indicator value is larger than a preset threshold value to a state where the reliability indicator value is smaller than the preset threshold value.

BRIEF DESCRIPTION OF THE DRAWINGS

In the accompanying drawings:

FIGS. 7A to 7D are each an explanatory drawing of an example of voice information of the obstacle information providing means 2 in FIG. 1;

FIG. 8 is an explanatory drawing showing how the obstacle information providing means 2 in FIG. 1 operates;

DETAILED DESCRIPTION OF THE PREFERRED EMBODIMENTS

<First Embodiment>

Figure 1:
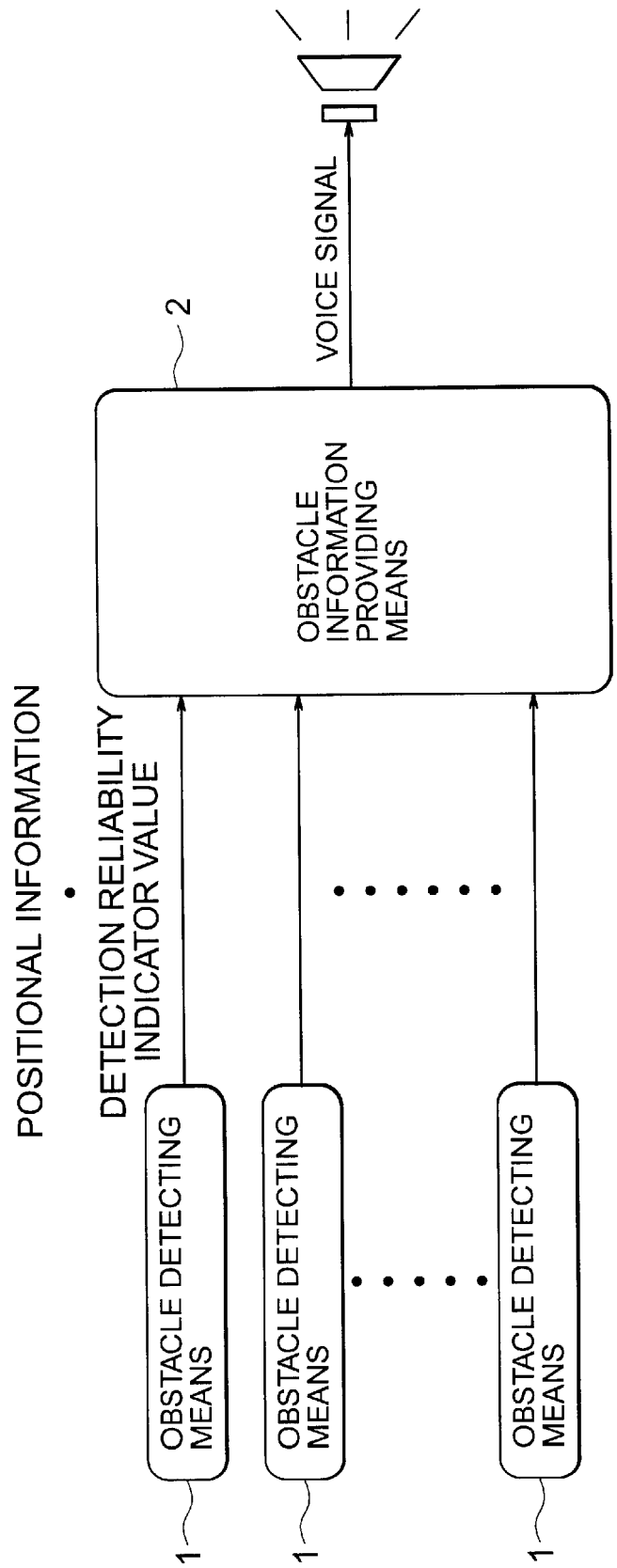
FIG. 1 is a block diagram showing a driving support apparatus according to a first embodiment of the present invention and relates to an example where the present invention is applied to a parking support system.

FIG. 1 is a block diagram showing a driving support apparatus according to a first embodiment of the present invention and relates to an example where the present invention is applied to a parking support system. As shown in FIG. 1, the driving support apparatus according to the first embodiment includes a plurality of obstacle detecting means 1 for detecting an obstacle around a vehicle, and a voice information providing means 2 for outputting positional information of an obstacle detected by these obstacle detecting means 1 by voice.

Figure 2:
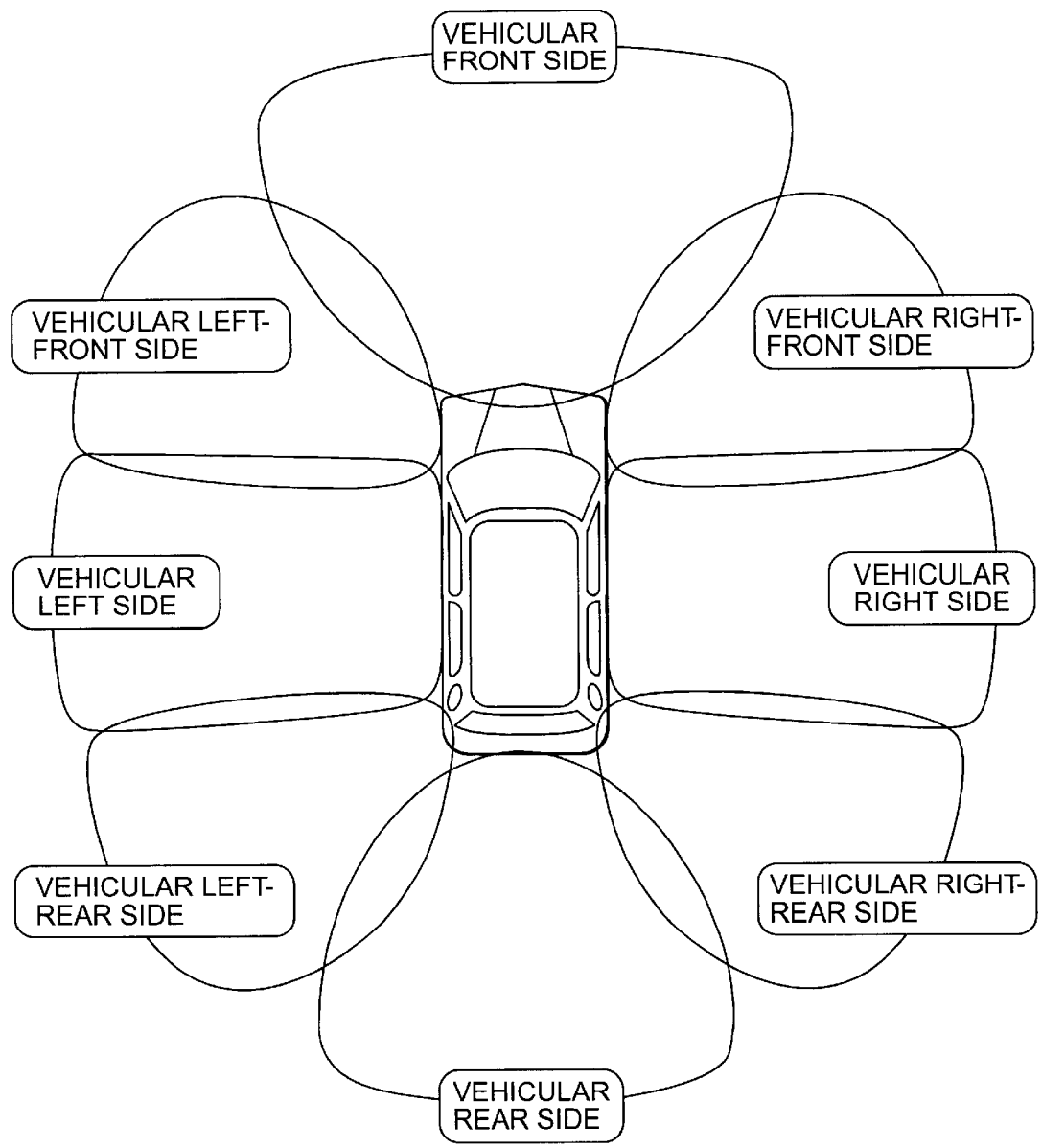
FIG. 2 is an explanatory drawing showing a detection area of each obstacle detecting means 1 in FIG. 1.

Here, as shown in FIG. 2, the obstacle detecting means 1 are each provided around the vehicle, that is, on a vehicular front side, a vehicular right-front side, a vehicular right side, a vehicular right-rear side, a vehicular rear side, a vehicular left-rear side, a vehicular left side, and a vehicular left-front side. Each obstacle detecting means 1 is also an ultrasonic sensor having a detection area, as illustrated.

Figure 3:
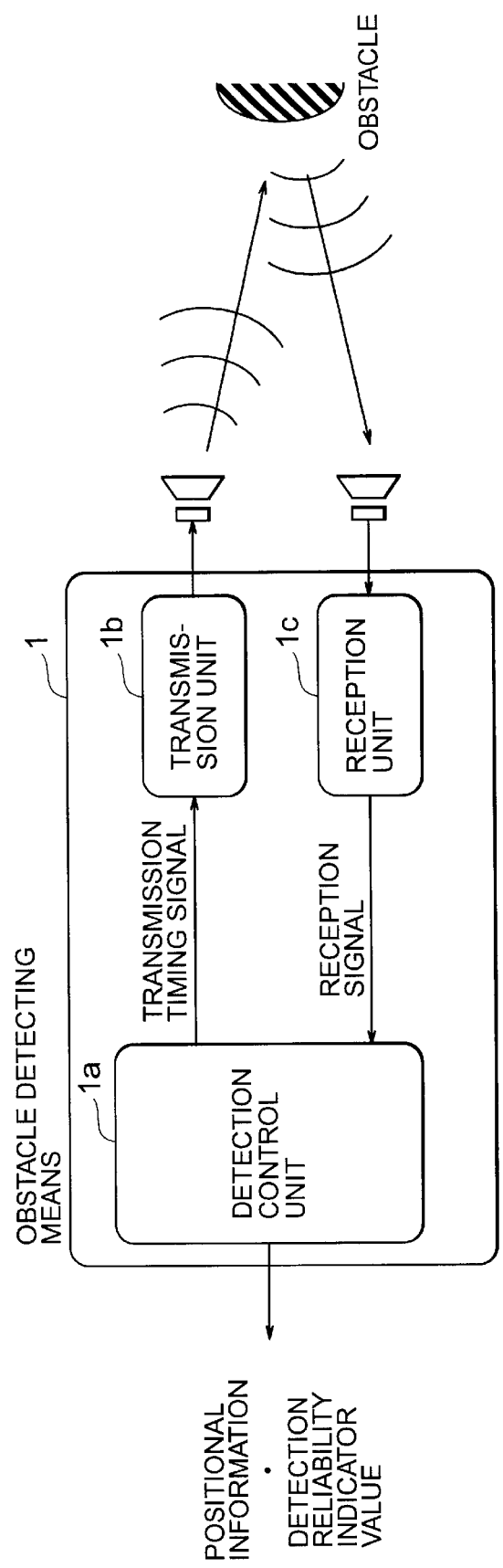
FIG. 3 shows the internal construction of the obstacle detecting means 1 in FIG. 1.

FIG. 3 is a block diagram showing the internal construction of the obstacle detecting means 1. As shown in FIG. 3, each obstacle detecting means 1 includes a detection controlling unit 1a that transmits a transmission timing signal to a transmission unit 1b and calculates a distance to an obstacle (positional information) and a detection reliability indicator value on the basis of a reception signal from a reception unit 1c, the transmission unit 1b that transmits an ultrasonic signal to an obstacle on the basis of the transmission timing signal from the detection control unit 1a, and the reception unit 1c that receives a reflection signal returning from the obstacle through reflection and inputs the reflection signal into the detection control unit 1a as a reception signal.

In the construction described above, the detection control unit 1a generates the transmission timing signal in fixed cycles, and the transmission unit 1b transmits the ultrasonic signal toward an obstacle in accordance with the transmission timing signal. The reception unit 1c receives the reflection signal returning from the obstacle through reflection of the signal transmitted by the transmission unit 1b, and inputs the reflection signal into the detection control unit 1a as a reception signal. On the basis of this reception signal, the detection control unit 1a calculates a distance to the obstacle (positional information) and a detection reliability indicator value (degree of sureness of the detection) using the received reception signal. A method of calculating the distance to an obstacle and a method of calculating a detection reliability indicator value will be described below.

Figure 4:
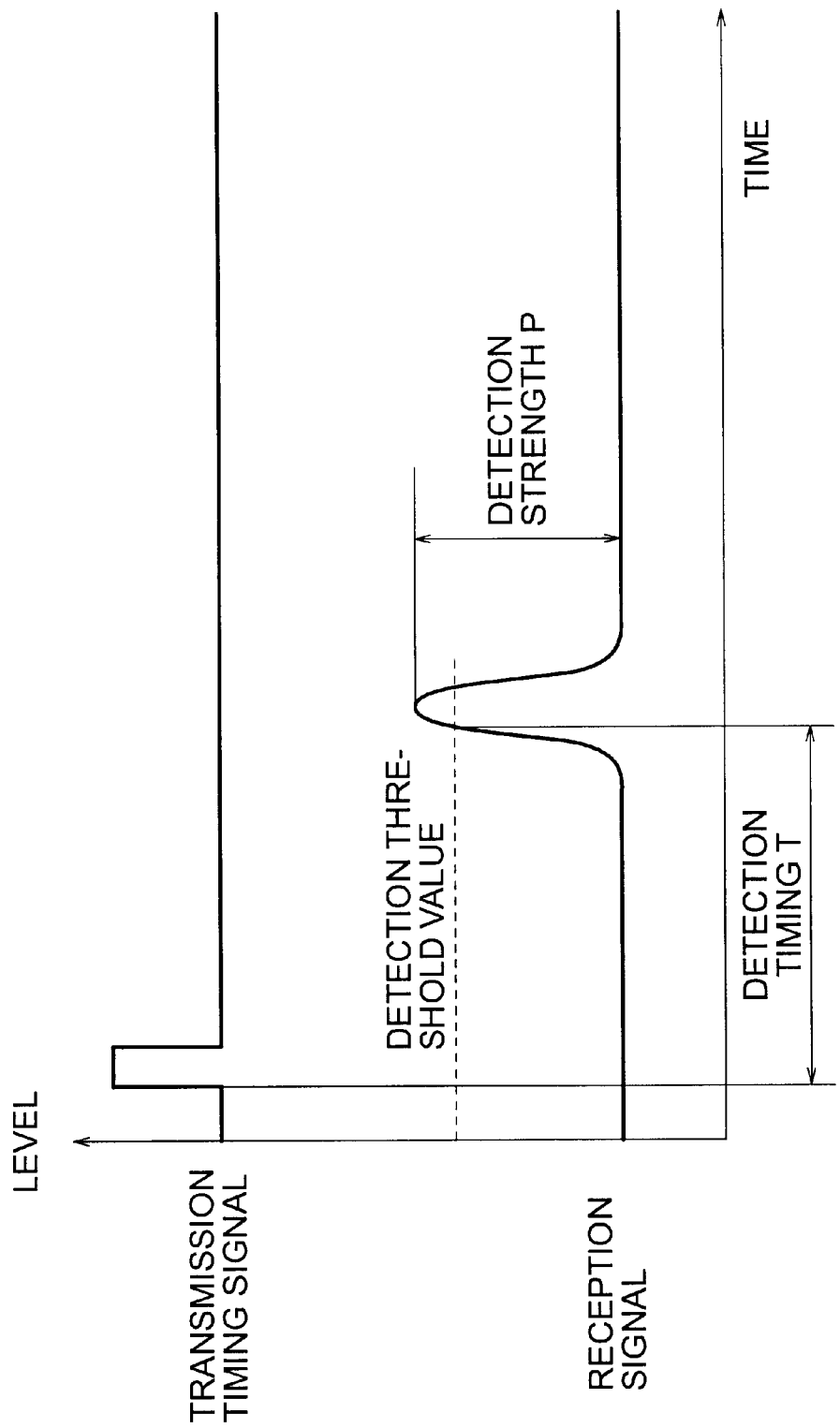
FIG. 4 is an explanatory drawing of a detection operation of the obstacle detecting means 1 in FIG. 1.
Figure 5:
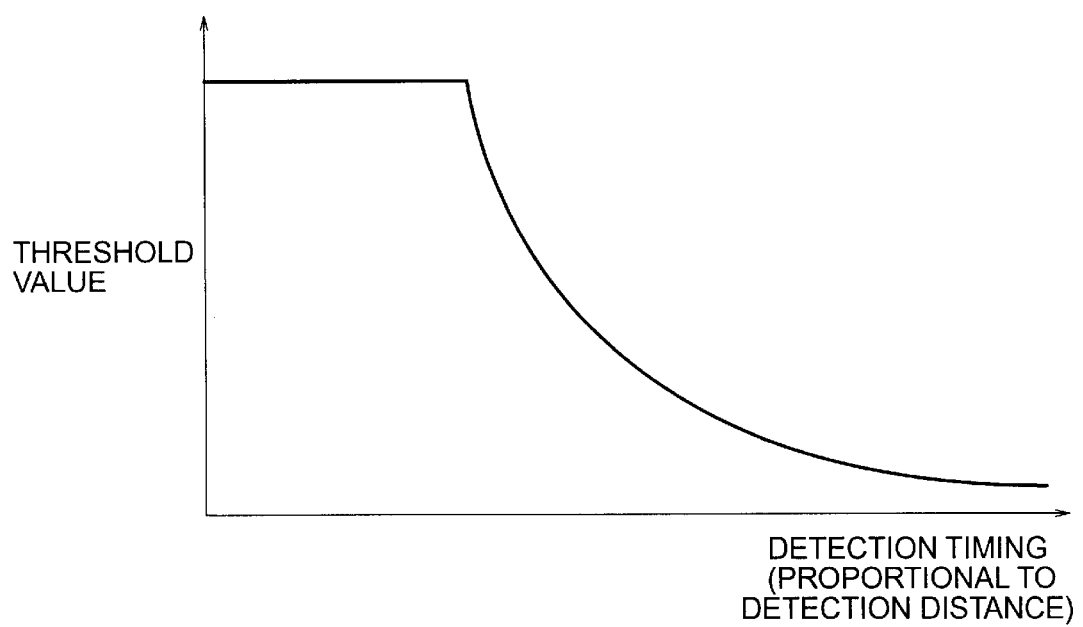
FIG. 5 is an explanatory drawing of an example where there is set a threshold value of the obstacle detecting means 1 in FIG. 1.

First, there will be described the method with which the detection control unit 1a calculates the distance to an obstacle. FIG. 4 shows an example of a reception signal inputted by the reception unit 1c. As shown in FIG. 4, the detection control unit 1a according to the first embodiment regards a time period from the rising of a transmission timing signal set by itself to a timing, at which the level of a reception signal exceeds a preset detection threshold value, as a detection timing T. As the detection threshold value, there may be, for instance, set a detection level or the like that is obtained at each distance for an obstacle, out of obstacles that are detection targets, for which the minimum reception signal level is obtained during detection. An example of the detection threshold value is shown in FIG. 5. The detection timing T has a proportional relation to a distance to an obstacle, so that the distance to the obstacle is calculated by multiplying the detection timing T by a preset certain constant.

Next, there will be described a method with which the detection control unit 1a calculates a detection reliability indicator value (degree of sureness of detection). As examples of the method of calculating a detection reliability indicator value, there will be described a method that uses the strength of a reflection signal, a method that uses the number of successive detections, and a method that uses a totalized value of the strength of a reflection signal.

<Method Using Strength of Reflection Signal>

A detection reliability indicator value is calculated using a detection strength P concerning the peak value of the reception signal shown in FIG. 4 and a detection threshold value corresponding to the detection timing T. When the detection strength P and the detection threshold value are compared with each other, if the detection strength P is sufficiently greater than the detection threshold value, this means that there is a low probability that a detection result is obtained as a result of erroneous detection of noise or the like (the detection level is relatively low). That is, it can be said that the detection reliability is increased in accordance with the increase of the detection strength P with reference to the detection threshold value. Consequently, if a value obtained by dividing the detection strength P by the detection threshold value is set as a detection reliability indicator value, it becomes possible to calculate a detection reliability indicator value without difficulty.

<Method Using Number of Consecutive Detections>

The erroneous detection of noise or the like occurs intermittently and at unpredictable times. If the probability of occurrence of the erroneous detection of noise or the like is referred to as S, the possibility that noise or the like is consecutively detected "n" times becomes Sn. Consequently, the probability that data consecutively detected n times is correct becomes (1−Sn). If the probability S described above is experimentally obtained and set in advance and the probability that data is correct is calculated using the expression described above, it becomes possible to calculate a detection reliability indicator value without difficulty.

<Method Using Totalized Value of Strength of Reflection Signal>

If the detection strength P is sufficiently greater than the detection threshold value, this means that there is a low possibility that a detection result is obtained as a result of erroneous detection of noise or the like (the detection level is relatively low). Also, the probability of consecutive detections is exponentially decreased in accordance with the increase of the number of consecutive detections, so that if a value obtained by totalizing a predetermined number of detection strengths P is set as a detection reliability indicator value, it becomes possible to calculate a detection reliability indicator value without difficulty. Note that in the case where no obstacle is detected, there occurs no problem in performing the calculation by setting the detection strength at "0".

Figure 6:
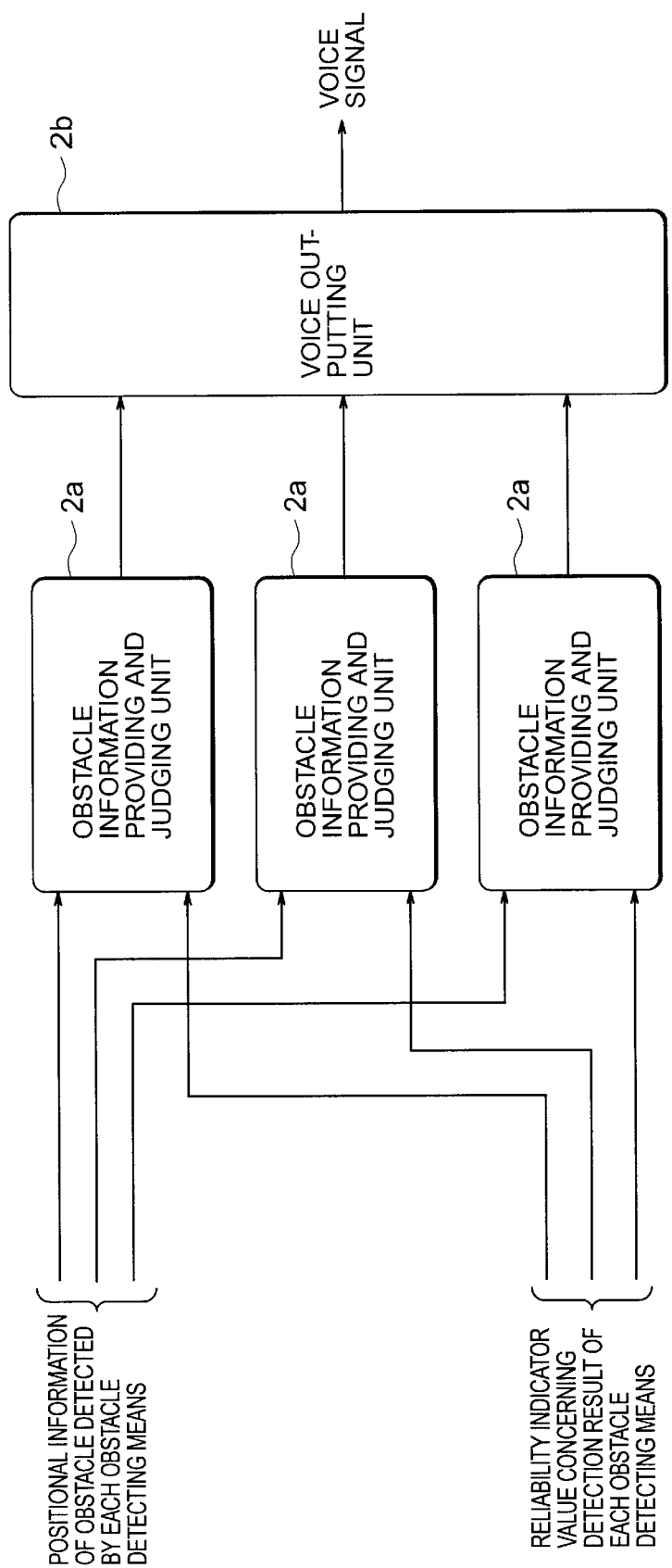
FIG. 6 shows the internal construction of an obstacle information providing means 2 in FIG. 1.

Next, there will be described the obstacle information providing means 2 shown in FIG. 1. FIG. 6 shows the internal construction of the obstacle information providing means 2. As shown in FIG. 6, the obstacle information providing means 2 includes a plurality of obstacle information providing and judging units 2a that each perform the judgment concerning the switching of voice information to be provided on the basis of the input of positional information of an obstacle detected by each obstacle detecting means and a reliability indicator value concerning the detection result, and a voice outputting unit 2b that outputs voice information on the basis of an output from this obstacle information providing and judging unit 2a.

When the obstacle detecting means 1 detects an obstacle and outputs positional information, the obstacle information providing and judging unit 2a judges, in accordance with the outputted positional information, whether the obstacle exists within a predetermined area in which the obstacle exists in proximity to the vehicle where there is a high possibility that the vehicle collides with the obstacle. In the case where it is judged that the obstacle exists in the predetermined area in which there is a high possibility of collision, if the reliability indicator value is greater than a preset certain value, the obstacle information providing and judging unit 2a requests the voice outputting unit 2b to output voice information in the "list of voice information with warning contents" shown in FIG. 7A. In the other case, the obstacle information providing and judging unit 2a requests the voice output unit 2b to output voice information to the "list of voice information with attention calling contents" shown in FIG. 7B.

Also, in the case where it is judged that the obstacle exists outside the predetermined area in which there is a high possibility of collision, if the reliability indicator value is greater than a preset certain value, the obstacle information providing and judging unit 2a requests the voice outputting unit 2b to output voice information to the "list of voice information with conclusive contents" shown in FIG. 7C. In the other case, the obstacle information providing and judging unit 2a requests the voice outputting unit 2b to output voice information to the "list of voice information with presumptive contents" shown in FIG. 7D. FIG. 8 is an explanatory drawing in which the aforementioned operations of the obstacle information providing and judging unit 2a are summarized.

The voice output unit 2b selects voice information in an area of a voice information list requested by the obstacle information providing and judging unit 2a in accordance with the voice outputting request from the obstacle information providing and judging unit 2a. The voice output unit 2b then outputs a voice signal.

Accordingly, with the technique of the first embodiment, the contents of voice information is switched in accordance with a reliability indicator value (degree of sureness of detection) concerning an obstacle detection result, so that it becomes possible for a driver to know the reliability of the provided information.

Also, if the reliability indicator value is at least equal to a preset threshold value, there is provided voice information with conclusive contents. In the other case, there is provided voice information with presumptive contents. In this manner, it becomes possible to make a driver aware of the reliability of the information in a natural manner.

Further, if the reliability indicator value is at least equal to a preset threshold value, there is provided voice information with warning contents. In the other case, there is provided voice information with attention calling contents. In this manner, it becomes possible to make a driver aware of the reliability of the information in a natural manner.

<Second Embodiment>

Figure 9:
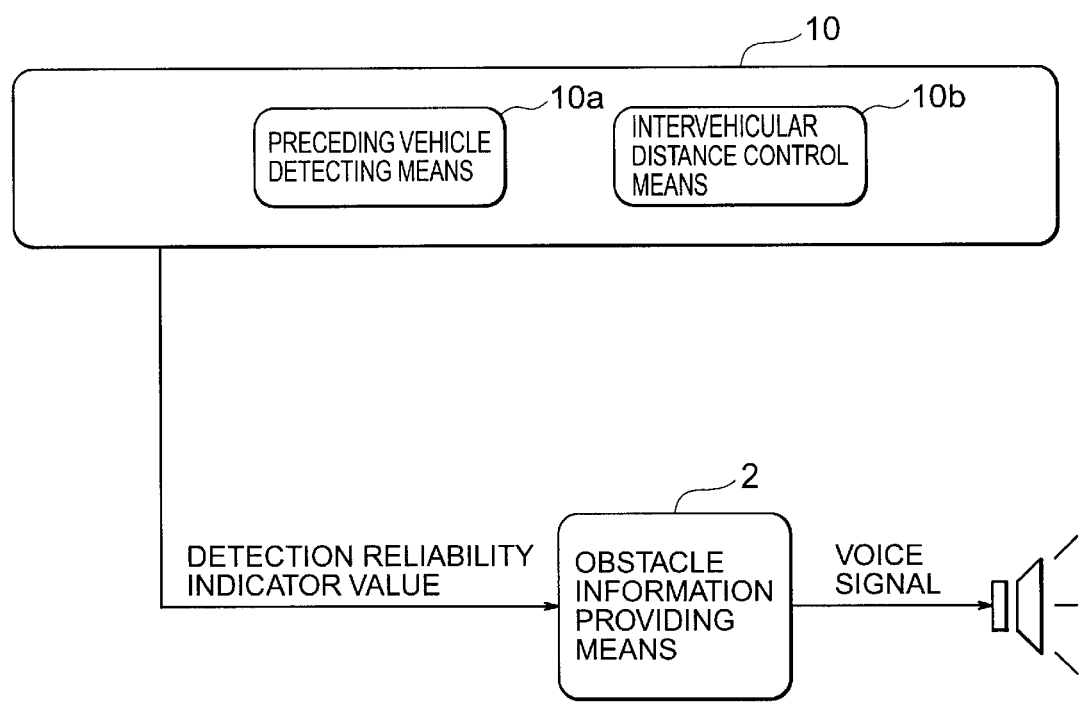
FIG. 9 is a block diagram showing a driving support apparatus according to a second embodiment of the present invention and relates to an example where the present invention is applied to intervehicular distance control.

Next, in the second embodiment of the present invention, there will be described an example where the present invention is applied to the intervehicular distance control apparatus described in JP 2000-180537 A as an example. FIG. 9 is a functional block diagram of a system in which the present invention is applied to the intervehicular distance control apparatus disclosed in the above document. An intervehicular distance control apparatus 10 shown in FIG. 9 includes a preceding vehicle detecting means 10a for detecting a preceding vehicle and an intervehicular distance control means 10b for controlling an intervehicular distance to the detected preceding vehicle, with these means being the same as those of the intervehicular distance control apparatus described in JP 2000-180537 A as an example. Also, the obstacle detecting means 1 according to the first embodiment shown in FIG. 1 is embedded in the preceding vehicle detecting means 10a, so that a reliability indicator value concerning a detection result (degree of sureness of detection) is outputted to the obstacle information providing means 2. Note that the obstacle detecting means 1 is embedded in the preceding vehicle detecting means 10a in FIG. 9, although the obstacle detecting means 1 may also be embedded in the intervehicular distance control apparatus 10.

Here, the intervehicular distance control apparatus 10 inputs a detection reliability indicator value into the obstacle information providing means 2. As this reliability indicator value concerning a detection result, for instance, there may be used presence probability obtained with a method disclosed in JP 2000-180537 A for obtaining the presence probability of a detection object. When the inputted reliability indicator value changes from a state where the value is greater than a preset threshold value to a state where the value is smaller than the preset threshold value, the obstacle information providing means 2 outputs a voice signal, whose contents are "Please pay attention to front side", in order to call driver's attention. During the judgment concerning the relation of magnitude with the threshold value described above, in order to prevent the repetitive occurrence of a voice signal at short intervals due to the fluctuations of the reliability indicator value, it is more preferable to use a threshold value with hysteresis.

On the other hand, under a state where the reliability indicator value is smaller than the preset threshold value described above or a separately preset threshold value, the obstacle information providing means 2 repeatedly outputs a voice signal, whose contents are "Intervehicular distance control is unstable" at predetermined time intervals, in order to call driver's attention.

Accordingly, with the technique of the second embodiment, in the intervehicular distance control apparatus 10, when the reliability indicator value (degree of sureness of detection) is lowered, there is provided voice information for calling attention, so that it becomes possible for a driver to naturally know the reliability of an intervehicular distance control operation performed by the system.

Also, in the intervehicular distance control apparatus 10, when the reliability indicator value (degree of sureness of detection) is low, there is provided voice information for calling attention, so that it becomes possible for a driver to naturally know the reliability of an intervehicular distance control operation performed by the system.

<Third Embodiment>

Figure 10:
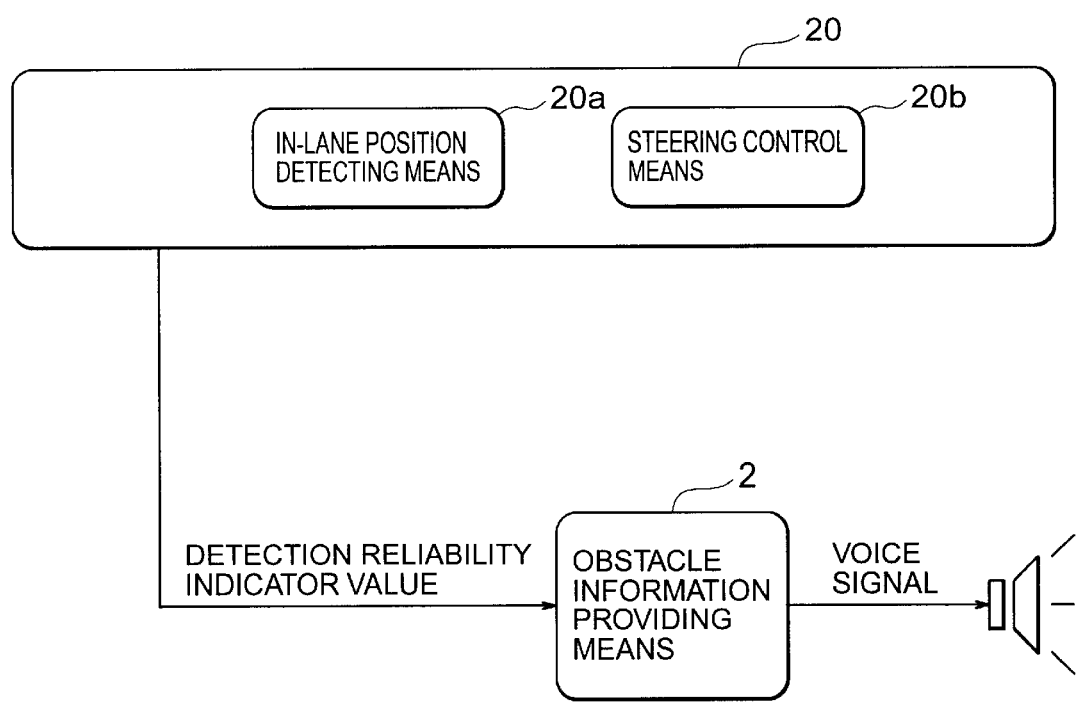
FIG. 10 is a block diagram showing a driving support apparatus according to a third embodiment of the present invention and relates to an example where the present invention is applied to a steering control apparatus.

Next, in the third embodiment of the present invention, there will be described an example where the present invention is applied to a steering control apparatus described in JP 11-110042 A as an example. FIG. 10 is a functional block diagram of a system in which the present invention is applied to the steering control apparatus disclosed in the document described above. The steering control apparatus 20 shown in FIG. 10 includes an in-lane position detecting means 20a for detecting an in-lane position of an own vehicle and a steering control means 20b for performing control for keeping in-lane traveling on the basis of a detection result concerning the detected in-lane position, with these means being the same as those of the steering control apparatus described in JP 11-110042 A as an example. Also, the obstacle detecting means 1 according to the first embodiment shown in FIG. 1 is embedded in the in-lane position detecting means 20a, and a reliability indicator value concerning a detection result (degree of sureness of detection) is outputted to the obstacle information providing means 2. Note that the obstacle detecting means 1 is embedded in the in-lane position detecting means 20a in FIG. 10, although the obstacle detecting means 1 may also be embedded in the steering control apparatus 20.

Here, the steering control apparatus 20 inputs a reliability indicator value into the obstacle information providing means 2. As this reliability indicator value, there may be used a brightness level of a guide way portion of an image taken by a camera used as the position detecting means disclosed in JP 11-110042 A or a brightness ratio between the guide way portion and other portions. The brightness level or brightness ratio indicates how sharp the camera recognizes the guide way, so that it is possible to use them as a detection reliability indicator value. When the inputted reliability indicator value changes from a state where the value is greater than a preset threshold value to a state where the value is smaller than the preset threshold value, the obstacle information providing means 2 outputs a voice signal, whose contents are "Please pay attention to movement of the steering wheel", in order to call driver's attention. During the judgment concerning the relation of magnitude with the threshold value described above, in order to prevent the repetitive occurrence of a voice signal at short intervals due to the fluctuations of the reliability indicator value, it is more preferable to use a threshold value with hysteresis.

On the other hand, under a state where the reliability indicator value is smaller than the preset threshold value described above or a separately preset threshold value, the voice information providing means repeatedly outputs a voice signal, whose contents are "Automatic steering control is unstable" at predetermined time intervals, in order to call the driver's attention.

Accordingly, with the technique of the third embodiment, in the steering control apparatus 20, when the reliability indicator value (degree of sureness of detection) is lowered, there is provided voice information for calling attention, so that it becomes possible for a driver to naturally know the reliability of an lane keeping control operation performed by the system.

Also, in the steering control apparatus 20, when the reliability indicator value (degree of sureness of detection) is low, there is provided voice information for calling attention, so that it becomes possible for a driver to naturally know the reliability of the lane keeping control operation performed by the system.

As described above, with the technique of the present invention, the contents of voice information is switched in accordance with a reliability indicator value (degree of sureness of detection) concerning an obstacle detection result, so that it becomes possible for a driver to know the reliability of the provided information.

Also, by providing voice information with conclusive contents if the reliability indicator value outputted from the obstacle detecting means is at least equal to a preset threshold value, and providing voice information with presumptive contents in the other case, it becomes possible for a driver to be naturally aware of the reliability of information.

Also, by providing voice information with warning contents if the reliability indicator value outputted from the obstacle detecting means is at least equal to a preset threshold value, and providing voice information with attention calling contents in the other case, it becomes possible for a driver to be naturally aware of the reliability of information.

Also, in the intervehicular distance control apparatus, when the reliability indicator value (degree of sureness of detection) is lowered, there is provided voice information for calling attention, so that it becomes possible for a driver to naturally know the reliability of an intervehicular distance control operation performed by the system.

Also, in the intervehicular distance control apparatus, when the reliability indicator value (degree of sureness of detection) is low, there is provided voice information for calling attention, so that it becomes possible for a driver to naturally know the reliability of an intervehicular distance control operation performed by the system.

Also, in the steering control apparatus, when the reliability indicator value (degree of sureness of detection) is lowered, there is provided voice information for calling attention, so that it becomes possible for a driver to naturally know the reliability of an in-lane keeping control operation performed by the system.

Also, in the steering control apparatus, when the reliability indicator value (degree of sureness of detection) is low, there is provided voice information for calling attention, so that it becomes possible for a driver to naturally know the reliability of an in-lane keeping control operation performed by the system.

What is claimed is:

1. A driving support apparatus comprising:
   obstacle detecting means for detecting an obstacle around a vehicle; and
   obstacle information providing means for outputting, by voice, positional information of the obstacle detected by the obstacle detecting means,
   wherein the obstacle detecting means includes a function of calculating a reliability indicator value concerning a detection result, the reliability indicator value indicating a degree of certainty of the positional information of the obstacle detected by the obstacle detecting means, and
   the obstacle information providing means includes an obstacle information providing and judging unit that judges switching of contents of voice information to be provided in accordance with magnitude of the reliability indicator value outputted from the obstacle detecting means.

2. A driving support apparatus according to claim 1, wherein the obstacle information providing means provides voice information with conclusive contents if the reliability indicator value outputted from the obstacle detecting means is greater than or equal to a preset threshold value, and provides voice information with presumptive contents when the reliability indicator value is less than the preset threshold value.

3. A driving support apparatus according to claim 1, wherein the obstacle information providing means provides voice information with warning contents if the reliability indicator value outputted from the obstacle detecting means is greater than or equal to a preset threshold value, and provides voice information with attention calling contents when the reliability indicator value is less than the preset threshold value.

4. A driving support apparatus comprising:
   a preceding vehicle detecting means for detecting a preceding vehicle;
   an intervehicular distance control means for controlling an intervehicular distance to the preceding vehicle detected by the preceding vehicle detecting means;
   a function of calculating a reliability indicator value concerning a detection result of the preceding vehicle detecting means, the reliability indicator value indicating a degree of certainty of the intervehicular distance to the preceding vehicle detected by the preceding vehicle detecting means; and
   obstacle information providing means for providing voice information for calling driver's attention when the reliability indicator value changes from a state where the reliability indicator value is larger than a preset threshold value to a state where the reliability indicator value is smaller than the preset threshold value.

5. A driving support apparatus according to claim 4, wherein the obstacle information providing means provides voice information for calling driver's attention at preset certain time intervals when the reliability indicator value is smaller than the preset threshold value.

6. A driving support apparatus comprising:
   in-lane position detecting means for detecting an in-lane position of a driver's vehicle;
   steering control means for performing control for keeping in-lane traveling on the basis of a detection result concerning the in-lane position detected by the in-lane position detecting means;
   a function of calculating a reliability indicator value concerning the detection result of the in-lane position detecting means, the reliability indicator value indicating a degree of certainty of the in-lane position detected by the in-lane position detecting means; and
   obstacle information providing means for providing voice information for calling driver's attention when the reliability indicator value changes from a state where the reliability indicator value is larger than a preset threshold value to a state where the reliability indicator value is smaller than the preset threshold value.

7. A driving support apparatus according to claim 6, wherein the obstacle information providing means provides voice information for calling driver's attention at preset certain time intervals when the reliability indicator value is smaller than the preset threshold value.

8. A driving support apparatus comprising:
   obstacle detecting unit that detects an obstacle around a vehicle; and
   obstacle information providing unit that outputs, by voice, positional information of the obstacle detected by the obstacle detecting unit,
   wherein the obstacle detecting unit includes a function of calculating a reliability indicator value concerning a detection result, the reliability indicator value indication a degree of certainty of the positional information of the obstacle detected by the obstacle detecting unit, and the obstacle information providing unit includes an obstacle information providing and judging unit that judges switching of contents of voice information to be provided in accordance with magnitude of the reliability indicator value outputted from the obstacle detecting unit.

9. A driving support apparatus according to claim 8, wherein the obstacle information providing unit provides voice information with conclusive contents when the reliability indicator value outputted from the obstacle detecting unit is greater than or equal to a preset threshold value, and provides voice information with presumptive contents when the reliability indicator value is less than the preset threshold value.

10. A driving support apparatus according to claim 8, wherein the obstacle information providing unit provides voice information with warning contents when the reliability indicator value outputted from the obstacle detecting unit is greater than or equal to a preset threshold value, and provides voice information with attention calling contents when the reliability indicator value is less than the preset threshold value.

11. A driving support apparatus comprising:

a preceding vehicle detecting unit that detects a preceding vehicle;

an intervehicular distance control unit that controls an intervehicular distance to the preceding vehicle detected by the preceding vehicle detecting means;

a function of calculating a reliability indicator value concerning a detection result of the preceding vehicle detecting unit, the reliability indicator value indicating a degree of certainty of the intervehicular distance to the preceding vehicle detected by the preceding vehicle detecting unit; and an obstacle information providing unit that provides voice information for calling a driver's attention when the reliability indicator value changes from a state where the reliability indicator value is larger than a preset threshold value to a state where the reliability indicator value is smaller than the preset threshold value.

12. A driving support apparatus according to claim 11, wherein the obstacle information providing unit provides voice information for calling driver's attention at preset certain time intervals when the reliability indicator value is smaller than the preset threshold value.

13. A driving support apparatus comprising:

an in-lane position detecting unit that detects an in-lane position of driver's vehicle;

a steering control unit that controls in-lane traveling on the basis of a detection result concerning the in-lane position detected by the in-lane position detecting unit;

a function of calculating a reliability indicator value concerning the detection result of the in-lane position detecting unit, the reliability indicator value indicating a degree of certainty of the in-lane position detected by the in-lane position detecting unit; and an obstacle information providing unit that for provides voice information for calling a driver's attention when the reliability indicator value changes from a state where the reliability indicator value is larger than a preset threshold value to a state where the reliability indicator value is smaller than the preset threshold value.

14. A driving support apparatus according to claim 13, wherein the obstacle information providing unit provides voice information for calling driver's attention at preset certain time intervals when the reliability indicator value is smaller than the preset threshold value.

* * * * *